United States Patent [19]

Cox

[11] 3,959,207

[45] May 25, 1976

[54] LATEX VISCOSITY DEPRESSANTS

[75] Inventor: William L. Cox, Akron, Ohio

[73] Assignee: The Goodyear Tire & Rubber Company, Akron, Ohio

[22] Filed: Jan. 31, 1973

[21] Appl. No.: 328,212

Related U.S. Application Data

[63] Continuation of Ser. No. 107,487, Jan. 18, 1971, abandoned.

[52] U.S. Cl. .............................. 260/29.7 E; 260/3; 260/42.55; 260/45.95 H; 260/815; 260/819
[51] Int. Cl.$^2$...................... C08C 1/00; C08L 7/02; C08L 9/10
[58] Field of Search............ 260/3, 29.7 E, 45.95 H, 260/815, 819

[56] References Cited

UNITED STATES PATENTS

| | | | |
|---|---|---|---|
| 3,048,563 | 8/1962 | Seydel............................. | 260/29.7 E |
| 3,477,987 | 11/1969 | Hunter......................... | 260/45.95 H |

Primary Examiner—Wilbert J. Briggs, Sr.
Attorney, Agent, or Firm—F. W. Brunner; J. A. Rozmajzl

[57] ABSTRACT

The viscosity of a high viscosity latex, compounded or uncompounded, is lowered by the addition of certain phenolic compounds such as 2,4,6-tris-(1,1-dimethylbutyl)-phenol.

14 Claims, No Drawings

LATEX VISCOSITY DEPRESSANTS

This is a continuation of application Ser. No. 107,487 filed Jan. 18, 1971, and now abandoned.

This invention relates to the use of certain phenolic antioxidants as depressants of latex viscosity.

Various types of polymer latices are known in the art. They are used for a variety of purposes. Frequently it is necessary to increase the viscosities of the latices in order to enhance their performance in a particular application. This is often accomplished by the addition of compounds known as thickeners. Although much effort has been expended in the area of increasing latex viscosity and in the use of thickeners, relatively little attention has been given to the problem of latex viscosities which are too high for a particular use. Various factors contribute to higher viscosities. Among these are high solids contents, particle size distribution and the presence of large amounts of compounding ingredients such as fillers.

The viscosity of a latex is very dependent upon the concentration of the polymer which it contains. At low concentrations the effect is slight, but it becomes increasingly pronounced as the concentration rises. In general, the viscosity begins to rise exponentially when the volume fraction of the polymer in the latex reaches a value of from about 0.3 to about 0.5. A more dramatic rise normally begins to occur in the range from about 0.4 to about .6.

Particle size and particle size distribution for a given solids content also affects viscosity. At a given solids content large particle size latices are more fluid than are corresponding latices of smaller particle size.

Latices also become more viscous as the temperature is increased. Latices to be used for foam production are often loaded with inorganic or organic fillers. These fillers include feldspar; clays such as Kaolinite clays; mica; talc; lithopone; aluminum trihydrate and calcium carbonates including the various whitings, chalks and limestones. Aluminum trihydrate, although an expensive material and not commonly used as a filler, is an important additive where flame proofing is desirable. If the latex is highly viscous, it is difficult to load the latex with these fillers or any other compounding ingredients. That is, mixing rates are reduced because of high latex viscosities.

The addition of compounding ingredients such as fillers can result in higher viscosities. The fillers are normally added in amounts from about 10 parts to about 150 parts by weight per 100 parts by weight of polymer in the latex, more normally from about 20 parts to about 120 parts. In certain latex applications, for example in treating paper, higher loadings are used, for example up to 600 parts by weight and higher.

If the viscosity of the latex is too high, various problems can arise, whether the latex is compounded or uncompounded.

In the preparation of a light density foam, e.g., where the air to latex ratio is approximately 8 to 9 volumes of air to 1 volume of latex, it may be desirable to lower the viscosity of the latex since the higher the air to latex ratio and the higher the original latex viscosity, the greater is the froth viscosity. When such a light density foam is being used in a bank to spread coat a fabric, a high froth viscosity can result in an unmanageable situation at the bank. A high froth viscosity can also result in pouring and molding problems.

High viscosity latices, compounded or uncompounded, can also result in pumping and metering difficulties.

Latex spreading compounds require carefully controlled viscosity levels. As well as determining the ease of the handling the compound, viscosity has an important influence upon the extent that the latex will penetrate the fabric. Some degree of penetration is essential but complete penetration to the far side of the fabric is generlly undesirable. Therefore, optimum viscosities must be used. Not only is the bulk viscosity of a spreading compound important, but the nature of the relationship between flow rate and shear is also important.

Depending upon the type of pump or other type of apparatus used to move a latex, viscosity can be an important factor, A centrifuge pump can move highly viscous materials. However, an apparatus such as a blow case, where the latex is drawn in by a vacuum, the pressure raised, and the latex blown out, requires lower viscosity latices. For such an apparatus, it is preferable that the viscosity be less than 2500 centipoises and preferably under 500 centipoises.

A representative compounded viscosity range used in spreading foam backings for carpeting is 2500 to 2800 centipoises, although viscosities as high as 5000 to 7000 centipoises can be used. It is not unusual for thickeners to be added to latices for this purpose.

In coating paper, latices are compounded with up to 600 parts of filler and higher. A representative maximum viscosity value for the loaded composition is 3000 centipoises. Therefore the latex, before compounding, must possess a low viscosity, a representative range being 200 to 300 centipoises. If the viscosity of the compounded latex is too high, nonuniform distribution on the paper surface can result.

There are various ways of lowering the viscosity of latices including the addition of water to the latex. However, the addition of water results in reduced drying rates. It also results in shrinking problems where a foam is to be prepared from the latex. Another method of lowering the viscosity of a high solids latex, containing latex particles possessing a small average particle size, is to add a high solid latex with a high average particle size. There is a need for further ways of depressing viscosity. Preferably it should be a simple technique which has no adverse effect on the properties of the latex itself or the products treated with or fabricated from the latex, nor should it result in processing difficulties. Most Preferably it should also perform other functions such as protecting the latex against oxidation.

An object of the present invention is to provide a method of lowering the viscosity of a high viscosity latex without adversely affecting, and in fact in many instances enhancing the other properties of the latex and the polymer contained therein. Another object of the present invention is to provide a viscosity suppressant which is also an antioxidant. Other objects of the present invention will become apparent as the text herein proceeds.

The objects of the present invention are accomplished by incorporating into a high viscosity latex a phenolic antioxidant having the following structural formula:

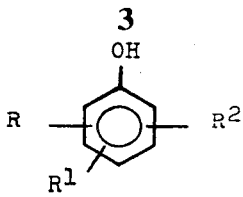

(I)

wherein R, R¹ and R² are selected from the group consisting of hydrogen and alkyl radicals having from 1 to 24 carbon atoms and wherein the sum of the carbon atoms in R, R¹ and R² is from 14 to 32 carbon atoms, preferably 16 to 24 carbon atoms.

Preferably R and R¹ are in positions ortho to the hydroxyl group and contain from 4 to 8 carbon atoms which are attached to the phenolic ring by a tertiary carbon atom. Illustrative of such radicals are tert. butyl; 1,1-dimethylpropyl; 1,1-dimethylbutyl; and 1,1,3,3-tetramethylbutyl. Preferably R² is in a position para to the hydroxyl group and contains 6 to 24 carbon atoms preferably 6 to 12 carbon atoms illustrated by the following radicals: hexyl; 1,1-dimethylbutyl; 1-propylbutyl; 1,1,3,3-tetramethylbutyl; 1,1,3-trimethylhexyl; 1,1,3,3,5,5-hexamethylhexyl; dodecyl and 1-methylnonyl.

All of the phenolic compounds of the present invention offer the polymer latex at least some small degree of protection against oxidative degradation. However, the preferred phenolic compounds above offer a relatively superior degree of antioxidant protection.

Although not the most outstanding antioxidants of the phenolic compounds described herein, among the better viscosity depressants of these compounds are those according to structural formula I where R² is an alkyl radical containing 18 to 24 carbon atoms, and is in a position ortho or para, and preferably para, to the hydroxy group.

Also among the more active depressants of the phenolic compounds according to structural formula I are those where R¹ and R² are alkyl radicals containing at least 9 carbon atoms each and preferably are in the para and ortho positions.

The following compounds are illustrative of the phenolic viscosity depressants used within the practice of the present invention.

2,4-dipentyl-6-butylphenol
2,6-di-tert-butyl-4-tert, hexylphenol
2,4,6-tripentylphenol
2,4,6-tris(1,1-dimethylbutyl) phenol 4-tetradecylphenol
2,4-bis(1,1,3,3-tetramethylbutyl)-6-(1,1-dimethylethyl)phenol
2,6-bis(1,1-dimethylethyl)-4-(1,1,3,3-tetramethylbutyl)phenol
2-octadecylphenol
2,4,6-tris(1,1,3,3-tetramethylbutyl) phenol
2,4-dioctyl-6-methylphenol
2-eicosylphenol
2,6-dimethyl-4-dodecylphenol
2,4-bis(1,1,2,2,3-pentamethylbutyl)-6-methylphenol
2,4-dinonyl-6-ethylphenol
2,6-di-tert.butyl-4-heptylphenol
2,4-bis(1-methylnonyl) phenol
2,4,6-tris(1-methylnonyl) phenol
2,4-bis(1,1-dimethylpropyl)-4-butylphenol
2,6-bis(1,1-dimethylethyl)-4-hexylphenol
2,6-bis(1,1-dimethylethyl)-4-(1,1,3,3-tetramethylbutyl)phenol
2,6-bis(1,1-dimethylethyl)-4-(1,1-dimethylhexyl) phenol
2,6-bis(1,1-dimethylethyl-4-eicosylphenol
2,6-bis(1,1-dimethylethyl)-4 -(1-methylheptadecyl)phenol
2,6-bis)1,1-dimethylethyl)-4-(1-methylundecyl) phenol
2-butyl-4-octyl-6-hexyl phenol
2,4-bis(1-methyltridecyl)-6-ethylphenol
2,6-bis(1-methyltridecyl)-4-ethylphenol
2-heptyl-4-octylphenol
2-heptyl-4-(1,1,3,3-tetramethylbutyl) phenol
2-(1,1-dimethylbutyl)-4-(1,1,3-trimethylhexyl) phenol
2,6-di tert.butyl-4-(1,1,3-trimethylhexyl) phenol
2,4-bis(1,1,3-trimethylhexyl) phenol
2,4-bis(1,1,3-trimethylhexyl)-6-methylphenol
2-tert.butyl-4-(1,1,3-trimethylhexyl)-6-methylphenol
2-tert.butyl-4-(1,1,3-trimethylhexyl)-6-ethylphenol
2-tert.butyl-4-(1,1,3-trimethylhexyl)-6-(1,1-dimethylbutyl) phenol
2,4-bis(1,1,3,3-tetramethylbutyl)-6-(1,1-dimethylpropyl)phenol
2,6-bis(1,1-dimethylbutyl)-4-(1,1,3-trimethylhexyl)-phenol
2.6(bis(1,1-dimethylbutyl)-4-(1-methylheptadecyl)-phenol
2,6-bis(1,1-dimethylbutyl)-6-(1-methylheptyl)phenol
2,4-bis(1,1,3,3-tetramethylbutyl)-6-(1,1-dimethylbutyl)phenol
2,4-bis(1,1,3-trimethylhexyl)-6-(1,1-dimethylpropyl)-phenol
2,4-bis(1-methylundecyl)-6-methylphenol
2,4,6-trinonylphenol
2,4-bis(1-methyltridecyl)-6-methylphenol The phenolic antioxidants of the present invention are synthesized by well known methods of alkylation of phenol and monosubstituted phenols consisting of o, m and p isomers. The preferred process is to treat the phenol or monosubstituted phenol with the appropriate olefins in the presence of a Friedel Craft type catalyst at a temperature of between 0°C. and 150°C. Preferred catalysts are $H_2SO_4$, the sulfonic acids and acid activated clays. Exact conditions such as catalyst quantity, temperature, molar ratios of olefin to phenol will depend upon the phenol and olefin being used, but are well known in the art. In case of dissimilar groups, such as tert.octyl and tert.butyl, mixtures of olefins may be used, but here it is preferred to react with the least active olefin first. Other alkylating agents such as alcohols and alkyl halides may be used; however, these agents are not preferred. Aluminum phenates may also be used as alkylation catalysts.

The present invention provides a way to reduce latex viscosities, compounded and uncompounded, without causing processing difficulties or adversely affecting the properties of the latex of the products treated with said latex or products fabricated therefrom. The viscosity depressants can be added to latices prior to foam formation, thereby decreasing the froth viscosity. This results in easier pouring of the foamed latex and/or improved spreading characteristics when forming carpet backing. The depressants can also be added to latices to improve pumping efficiency. Addition to latices to be compounded will permit the addition of higher amounts of inorganic fillers, e.g., where the latex is to be used to coat paper or to form a foamed product. The depressants also facilitate easier mixing of the fillers into the latices. Where a latex is being used to coat paper, the depressants can be used to reduce the viscosity of a compounded latex which otherwise would be so viscous that it would result in a non-uniform coating. The depressants can also be incorporated into latices whcih are to be used at lower temperatures. Where a fabric is being coated with a latex, and then being dried, it may be necessary due to the high viscosity of the latex, that the fabric be coated slowly to permit sufficient penetration of the latex into the fabric before the drying step. The addition of the viscosity supressant to the latex will result in a faster penetration rate and therefore permit a faster coating rate.

In foam manufacture, the latices used often possess a high viscosity. This is normally due to the need for high solids latex, for example, 60 percent solids and above and sometimes because of compounding the latex with high amounts, i.e., 50 to 100 parts by weight and above, of fillers. The high solids requirement is based on the fact that as low a water level as possible is desirable from a shrinkage and drying standpoint. Various problems can result because of the high viscosity. Included in these problems are low pumping rates, low spreading rates, and poor foaming rates. The viscosity depressants of the present invention, by addition to the latex, can result in reasonable viscosities without sacrificing the high solids contents and high levels of loading. On the other hand, where a highly loaded, high solids latex possesses a reasonable viscosity, but it is desirable to increase solids and/or the loading level without increasing viscosity, the present depressants can be added to the latex.

The high viscosity latices which benefit by the practice of the present invention are those latices both compounded and uncompounded which have a viscosity of at least 500 centipoises. Viscosity as referred to herein is conveniently measured according to ASTM D 1417-7 (1970 Annual Book of ASTM Standards, Vol. 28), the viscosity normally being measured with a Brookfield Viscometer. The depressants are particularly beneficial in latices having even higher viscosities such as those having a viscosity in the absence of these viscosity depressants of at least two or three thousand. The depressants are most beneficial in latices having a viscosity of at least 4000 centipoises.

The polymer latices that can benefit by the practice of the present invention include latices of substituted and unsubstituted, saturated and unsaturated, natural and synthetic polymers. The synthetic polymers are prepared by any of the well known free radical emulsion polymerizaton techniques. The oxidizable natural polymers include natural rubber in its various forms, e.g., pale crepe and smoked sheet, and balata and gutta percha. The oxidizable synthetic polymers, including rubbery synthetic polymers, are prepared from a single monomer (homopolymer) or a mixture of two or more copolymerizable monomers (copolymers) wherein the monomers are combined in a random distribution or block form. The monomers may be substituted or unsubstituted and may possess one or more double bonds, for example, diene monomers such as conjugated dienes, and polymerizable monoolefins, especially vinyl and vinylidene monomers. Examples of conjugated dienes are 1,3-butadiene, isoprene, chloroprene, 2-ethyl-1,3-butadiene, 2,3-dimethyl 1,3-butadiene and piperylene. Examples of vinyl monomers are styrene, acrylonitrile, acrylic acid, ethylacrylate, butylacrylate, methyl vinyl ether, vinyl acetate and vinyl pyridine. Examples of vinylidene monomers are $\alpha$-methylstyrene, methacrylic acid, methyl methacrylate, ethyl methacrylate, glycidyl methacrylate and vinylidene chloride. Representative examples of the synthetic polymer latices used in the practice of this invention are latices of homopolymers of a conjugated 1,3-diene such as isoprene and butadiene, and copolymers of a conjugated 1,3-diene such as isoprene and butadiene with up to 50 percent by weight of at least one copolymerizable monomer, especially vinyl and vinylidene monomers, such as styrene, acrylonitrile or vinylidene chloride. The depressants are particularly beneficial in latices used in the manufacture of foam rubber both natural and synthetic. They are also quite beneficial in latices used to coat and sometimes impregnate paper products. The latices used in all of these applications are well known. The operations involved in preparing foamed products and in coating and impregnating paper are also quite well known in the art. Some of the latices used in forming foam rubber products are described in U.S. Pat. Nos. 3,523,996; 3,496,055; 3,493,523 and 2,649,391. Latices for coating paper are represented by those described in U.S. Pat. Nos. 3,047,427 and 3,399,080. The latices used in making foam rubber are normally either natural rubber latices or a synthetic rubber latex, at least 40 to 50 percent of the bound monomer units being the segmeric form of a conjugated 1,3-diene such as 1,3-butadiene. Typical latices used in coating paper include butadiene-styrene latices and polyacrylate latices.

The viscosity depressants are added to the latex in liquid form, normally in the form of an emulsion. If the depressant is a solid, it is dissolved in an appropriate organic solvent such as toluene before being emulsified. Conventional emulsifiers, cationic, anionic or non-ionic are used. The solvents used to dissolve the solid depressant should have limited compatibility with the polymer in the latex to which the depressant is added.

In addition to acting as a viscosity depressant, the compounds of the present invention offer at least a small degree of antioxidant effectiveness. Therefore, every one of the depressants of the present invention serves a dual purpose. Not only do they reduce the viscosity of the latex to which they are added, but in addition they protect the polymer at least to some degree against oxidative degradation. They also are relatively nondiscoloring. As a result of their dual functionality, the better antioxidants of the phenolic compounds described herein afford an economic and step saving advantage in that often one need not incorporate two additives, i.e., both a viscosity depressant and an antioxidant, but only one additive which serves both functions.

The amount of phenolic compound to be added to the latex will depend naturally upon the particular depressant which is added, the viscosity of the latex to which it is added and the desired viscosity. Levels of from 0.10 part to 5.0 parts by weight of depressant per 100 parts by weight of polymer in the polymer latex and higher can be used. Most of the viscosity depressant effect, however, can be obtained normally by using as little as 1.0 to 3.0 parts. A preferred range is 0.25 to 3.0 parts, most preferably from 0.50 to 3.0 parts.

The viscosity depressant effect of the subject compounds is not normally permanent. Although the viscosity drops quickly as the depressant is added, it tends to rise and return toward the original viscosity with time. It is not completely clear what factors affect this time period. However, it is believed that the duration of depressant activity may be associated with the emulsifier used to emulsify the depressant. It is theorized that possibly when the emulsifier used to emulsify the depressant is similar to the emulsifier used to prepare the polymer latex, the duration of viscosity activity is shortened. Therefore, when it is desirable to reduce viscosity for a particular operation, preferably the depressant is added shortly before the operation.

The following working examples illustrate the preparation of phenolic viscosity depressants within the practice of the present invention.

EXAMPLE 1

The phenolic compound, 2,4,6-tris-(1,1-dimethylbutyl) phenol is prepared in the following manner. Ninety-four grams of phenol and 20 grams of toluene sulfonic acid are heated together at a temperature of 120° C. and 90 grams of 2-methyl-1-pentene are added over a 30 minute period. The mixture is cooled to 30° C. and the remaining 180 grams of 2-methyl-1-pentene are added dropwise over a 2 hour period. The reaction mixture is stirred 30 minutes longer and then neutralized with 20 grams of sodium carbonate in an aqueous solution. After decanting the aqueous layer, the product is stripped to a bottom temperture of 150° C. under vacuum.

EXAMPLE 2

Ninety-four grams of phenol, 4 grams of sulfuric acid and 12 grams of activated clay are heated to 60° C. At that temperature 224 grams of diisobutylene are added over a 2 hour period. After stirring the combination for 2 hours, 56 grams of isobutylene are added. The product is neutralized with 10 grams of sodium carbonate in 90 milliliters of water. The water layer is decanted. The product is stripped to a bottom temperature of 174° C. and a column temperature of 150° C. at 20 millimeters of mercury in the presence of 2 grams of dry sodium carbonate.

EXAMPLE 3

2,4-bis(1,1,3-trimethylhexyl) phenol is prepared in the following manner. Ninety-four grams of phenol and 20 grams of toluene sulfonic acid are heated together to 85° C. 2,4-dimethyl-1-heptene is added in the amount of 304 grams dropwise over a 3 hour period. The mixture is stirred 2 hours and neutralized with 20 grams of sodium carbonate in aqueous solution. After decanting 5 grams of dry sodium carbonate are added and the product is distilled. The fraction boiling at a column temperature of from 165° C. to 170° C. at 1.1 millimeters of mercury is collected.

The following examples illustrate, but are not intended to limit, the practice of the present invention.

EXAMPLES 4, 5 AND 6

Pliolite* 5362, an SBR latex which can be used for foam rubber applications and having a solids content of approximately 68 percent, was compounded with a feldspar-type filler (125 parts by weight per 100 parts by weight of latex solids). Various phenolic compounds were emulsified using potassium oleate and added to the loaded latex. They were all added in the amount of 2.50 parts by weight of the phenolic compound per 100 parts by weight of the latex solids. The average viscosity of the latex containg the feldspar-type filler before the addition of the phenolic compounds was 13,470 centipoises using a Model HAT Brookfield Viscometer and a number 2 spindle at 5 revolutions per minute. The viscosity of the latex was measured shortly after the addition of the phenolic compounds.

*Trademark of The Goodyear Tire & Rubber Company

Specifically a 20 percent aqueous solution of potassium oleate was added to the latex in an amount sufficient to provide 4 parts by weight of potassium oleate per 100 parts by weight of latex solids. The oleate aids in stabilizing the latex during the filler addition. The feldspar filler was then added in dry form under agitation to the latex. Viscosity measurements were made on the loaded latex, small amounts of water being added if necessary to facilitate easier measurement of the viscosity. Fifty percent aqueous emulsions of the phenolic compounds, with sodium oleate as the emulsifier, were added to the latex under agitation. Viscosity measurements were made shortly thereafter.

All of the Examples 4, 5 and 6 involve the use of phenolic viscosity depressants within the practice of the present invention. Example 4 involves the use of a trihexylated phenol. Example 5 involves a compound which is a mixture of butylated and octylated phenols, one of the main constituents being a phenolic compound containing a butyl group in an ortho position and octyl groups in the ortho and para positions. Example 6 involves the use of a phenolic compound having a single large alkyl substituent.

The results are tabulated in Table I. The Depressant Index was calculated by dividing the viscosity of the loaded latex after the addition of the viscosity depressant by the viscosity of the loaded latex prior to the addition of the viscosity depressant.

Table I

| Ex. | Viscosity Depressant | Depressant Index |
|---|---|---|
| 4 | 2,4,6-tris-(1,1-dimethylbutyl)phenol | 0.34 |
| 5 | Similar to the product of Example 2 | 0.38 |
| 6 | Poly(isobutyl)phenol[1] | 0.33 |
| (1) | Poly(Isobutyl)Phenol-450 (PIBP-450) having the structural formula | |

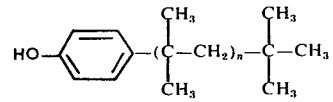

Average Molecular Weight = ca.450 n(ave) = 5
Available from Rohm and Haas Company The above data demonstrates the effectiveness of compounds used within the practice of the present invention in reducing the viscosity of a compounded latex. In each case the viscosity was reduced to about one-third of the original viscosity. Naturally water added as part of the emulsion has an effect on viscosity, but the phenolic compounds themselves were responsible for the major portion of the reduction. Tests would indicate that all three of the compounds offer some degree of protection against oxidation, although the depressants in Examples 4 and 5 would be superior in this respect to the compound of Examples 6.

The phenolic compound of Example 6 was butylated and used as a depressant. It's Depressant Index was 0.30.

Two phenolic antioxidants not within the scope of the present invention were tested along with the depressants described in Examples 4, 5 and 6. One antioxidant was a styrenated phenol. The other was a butylated, styrenated m-p, cresol. Neither reduced the latex viscosity. In fact, both antioxidants increased the viscosity of the latex.

The previous examples only illustrate the practice of the present invention. They do not limit it. Any of the viscosity depressants specifically recited or generically described herein, such as 2,4-bis(1,1,3-trimethylhexyl)phenol (Example 3), can be substituted in working examples 4, 5 or 6 for the viscosity depressants used. Such a substitution would result in a reduction in the latex viscosity. Also any of the latices described earlier herein, such as natural rubber latex or polybutadiene latex, could be substituted in whole or in part for the SBR latex used in Examples 4, 5 and 6. In each case the latex viscosity would be reduced. This is true for both compounded and uncompounded latices. In fact the viscosity of a 50/50 blend of natural rubber and SBR latices has been reduced by a combination of the phenolic compound of Example 1 and another viscosity depressant.

These viscosity depressants can also be used in combination with other antioxidants such as those described in U.S. Pat. No. 3,305,522.

While certain representative embodiments and details have been shown for the purpose of illustrating the invention, it will be apparent to those skilled in this art that various changes and modifications may be made therein without departing from the spirit or scope of the invention.

What is claimed is:

1. A polymer latex wherein the polymer is selected from the group consisting of natural rubber, homopolymers of conjugated 1,3-diene monomer, and copolymers of conjugated 1,3-diene monomer with at least one copolymerizable monomer selected from the group consisting of vinyl monomers and vinylidene monomers, said copolymers contaning up to 50 percent by weight of the copolymerizable monomer, said polymer latex having an original latex viscosity of at least 500 centipoises having incorporated therein 0.25 to 3.0 parts by weight of a liquid phenolic viscosity depressant per 100 parts by weight of polymer in the polymer latex said phenolic viscosity depresssant having the following structural formula

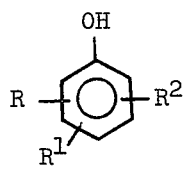

wherein R, $R^1$ and $R^2$ are selected from the group consisting of hydrogen and alkyl radicals having from 1 to 24 carbon atoms and wherein the sum of the carbon atoms in R, $R^1$ and $R^2$ is from 14 to 32 carbon atoms wherein the liquid depressant is in emulsion form.

2. The polymer latex according to claim 1 wherein R and $R^1$ contain 4 to 8 carbon atoms, are in positions ortho to the hydroxyl group and are attached to the phenolic ring by a tertiary carbon atom and wherein $R^2$ contains 6 to 24 carbon atoms and is in a position para to the hydroxyl group.

3. The polymer latex according to claim 2 wherein $R^2$ contains 6 to 12 carbon atoms.

4. The polymer latex according to claim 1 wherein $R^2$ is an alkyl radical containing 18 to 24 carbon atoms and is in a position para to the hydroxyl group.

5. The polymer latex according to claim 1 wherein $R^1$ and $R^2$ are alkyl radicals containing at least 9 carbon atoms each and wherein $R^1$ and $R^2$ are in positions ortho and part to the hydroxyl group.

6. The polymer latex according to claim 1 wherein the original latex viscosity is at least 4000 centipoises.

7. The polymer latex according to claim 1 wherein the latex is compounded latex containing a filler.

8. The polymer latex according to claim 7 wherein the filler is present in the amount of at least 20 parts of filler per 100 parts by weight of polymer in the latex.

9. The polymer latex according to claim 1 wherein the viscosity depressant is 2,4,6-tris-(1,1-dimethylbutyl) phenol.

10. The polymer latex according to claim 1 wherein the polymer latex is selected from the group consisting of polymer latex of copolymers of 1,3-butadiene and styrene and polymer latex of copolymers of 1,3-butadiene and acrylonitrile wherein said polymers contain up to 50 percent by weight of the styrene or acrylonitrile and natural rubber latex.

11. The polymer latex according to claim 1 wherein the conjugated 1,3-diene monomer is selected from the group consisting of 1,3-butadiene, isoprene, chloroprene, 2-ethyl-1,3-butadiene, 2,3-dimethyl-1,3-butadiene and piperylene, and the copolymerizable monomer is selected from the group consisting of styrene, acrylonitrile, acrylic acid, ethylacrylate, butylacrylate, methyl vinyl ether, vinyl acetate, vinyl pyridine, α-methylstyrene, methacrylic acid, methyl methacrylate, ethyl methacrylate, glycidyl methacrylate and vinylidene chloride.

12. A process of reducing the viscosity of a polymer latex having a viscosity of at least 500 centipoises, wherein the polymer is selected from the group consisting of natural rubber, homopolymers of conjugated 1,3-diene monomer, and copolymers of conjugated 1,3-diene monomer with at least one copolymerizable monomer selected from the group consisting of vinyl monomers and vinylidene monomers, said copolymers containing up to 50 percent by weight of the copolymerizable monomer, comprising incorporating therein 0.25 to 3.0 parts by weight of a liquid viscosity depressant per 100 parts by weight of polymer in he polymer latex, said viscosity depressant having the following structural formula

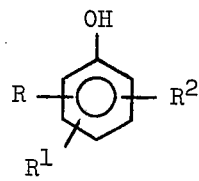

wherein R, $R^1$ and $R^2$ are selected from the group consisting of hydrogen and alkyl radicals having from 1 to 24 carbon atoms and wherein the sum of the carbon atoms in R, $R^1$ and $R^2$ is from 14 to 32 carbon atoms, wherein the depressant is in the form of an emulsion.

13. The process according to claim 12 wherein the latex is selected from the group consisting of polymer latex of copolymers of 1,3-butadiene and styrene and polymer latex of copolymers of 1,3-butadiene and acrylonitrile wherein sad polymers contain up to 50 percent by- weight of the styrene or acrylonitrile and natural rubber latex.

14. The process according to claim 13 wherein the conjugated 1,3-diene monomer is selected from the group consisting of 1,3-butadiene, isoprene, chloroprene, 2-ethyl-1,3-butadiene, 2,3-dimethyl-1,3-butadiene and piperylene, and the copolymerizable monomer is selected from the group consisting of styrene, acrylonitrile, acrylic acid, ethylacrylate, butylacrylate, methyl vinyl ether, vinyl acetate, vinyl pyridine, α-methylstyrene, methacrylic acid, methyl methacrylate, ethyl methacrylate, glycidyl methacrylate and vinylidene chloride.

* * * * *